US011864670B2

(12) United States Patent
Artwohl et al.

(10) Patent No.: US 11,864,670 B2
(45) Date of Patent: Jan. 9, 2024

(54) THERMAL FRAME

(71) Applicant: Anthony, Inc., Sylmar, CA (US)

(72) Inventors: Paul J. Artwohl, Stevensville, MI (US); Jeffery W. Nicholson, Palmdale, CA (US); Matthew Rolek, Valencia, CA (US); David Briggs Baugh, Palmdale, CA (US)

(73) Assignee: Anthony, Inc., Sylmar (CA)

( * ) Notice: Subject to any disclaimer, the term of this patent is extended or adjusted under 35 U.S.C. 154(b) by 0 days.

(21) Appl. No.: 17/816,849

(22) Filed: Aug. 2, 2022

(65) Prior Publication Data

US 2022/0361688 A1 Nov. 17, 2022

Related U.S. Application Data

(63) Continuation of application No. 17/157,259, filed on Jan. 25, 2021, now Pat. No. 11,439,253, which is a
(Continued)

(51) Int. Cl.
*A47F 3/04* (2006.01)
*F25D 21/04* (2006.01)
(Continued)

(52) U.S. Cl.
CPC ............ *A47F 3/0434* (2013.01); *A47F 3/043* (2013.01); *A47F 11/10* (2013.01); *E06B 1/325* (2013.01);
(Continued)

(58) Field of Classification Search
CPC ........ A47F 3/0434; A47F 3/043; A47F 11/10; E06B 1/325; E06B 1/524; F25D 21/04;
(Continued)

(56) References Cited

U.S. PATENT DOCUMENTS 2,858,408 A * 10/1958 Barroero ............... F25D 23/021 312/139.2
3,353,301 A * 11/1967 Heilweil ................. F25D 21/04 49/478.1
(Continued)

FOREIGN PATENT DOCUMENTS

CN 103189696 7/2013
CN 205561404 9/2016
(Continued)

OTHER PUBLICATIONS

CN Office Action in Chinese Application No. 201780080430.0, dated Feb. 3, 2020, 11 pages (with English translation).
(Continued)

*Primary Examiner* — Hanh V Tran
(74) *Attorney, Agent, or Firm* — Fish & Richardson P.C.

(57) ABSTRACT

The invention features a refrigerator cabinet door frame. The frame includes a thermally conductive outer frame, a thermally insulating inner frame member, and a sealing plate. The outer frame member includes a forward end having an outer surface that is disposed outside of a refrigerated cabinet with the frame mounted, and a rearward end defining a joint. The inner frame member includes a first end retained in the joint, and a second end. The sealing plate includes a first edge coupled to the outer frame member at the rearward end, forward of the joint, a second edge supported by the second end of the inner frame member, and a thermally conductive sealing surface. The first edge of the sealing plate is coupled to the outer frame member such that the sealing surface and the outer surface of the outer frame member together form a continuous heat transfer path.

19 Claims, 8 Drawing Sheets

Related U.S. Application Data continuation of application No. 16/518,633, filed on Jul. 22, 2019, now Pat. No. 10,898,011, which is a continuation of application No. 16/058,730, filed on Aug. 8, 2018, now Pat. No. 10,390,632, which is a continuation of application No. 15/362,589, filed on Nov. 28, 2016, now Pat. No. 10,045,638.

(51) Int. Cl.

| | |
|---|---|
| ***F25D 23/08*** | (2006.01) |
| ***A47F 11/10*** | (2006.01) |
| ***E06B 1/32*** | (2006.01) |
| ***E06B 1/52*** | (2006.01) |
| ***F25D 23/02*** | (2006.01) |
| ***F25D 27/00*** | (2006.01) |

(52) U.S. Cl.

CPC .............. *E06B 1/524* (2013.01); *F25D 21/04* (2013.01); *F25D 23/02* (2013.01); *F25D 23/082* (2013.01); *F25D 23/087* (2013.01); *F25D 27/00* (2013.01)

(58) Field of Classification Search

CPC ...... F25D 23/02; F25D 23/082; F25D 23/087; F25D 27/00

See application file for complete search history.

(56) References Cited

U.S. PATENT DOCUMENTS

| | | | | | |
|---|---|---|---|---|---|
| 3,499,245 | A * | 3/1970 | Richter | F25D 23/02 | 49/478.1 |
| 3,612,821 | A * | 10/1971 | Stromquist | F25D 23/02 | 219/214 |
| 4,696,078 | A * | 9/1987 | Stromquist | E05D 7/081 | 16/301 |
| 4,831,780 | A * | 5/1989 | Bockwinkel | F25D 23/082 | 49/478.1 |
| 4,852,303 | A * | 8/1989 | Rolek | F25D 23/082 | 49/478.1 |
| 4,941,289 | A * | 7/1990 | Rolek | F25D 23/028 | 49/478.1 |
| 4,998,382 | A * | 3/1991 | Kostos | E06B 3/6617 | 49/504 |
| 5,035,085 | A * | 7/1991 | Mamelson | A47F 3/043 | 49/478.1 |
| 5,111,618 | A * | 5/1992 | Kaspar | A47F 3/043 | 49/504 |
| 5,214,877 | A * | 6/1993 | Kaspar | F25D 17/047 | 49/70 |
| 5,255,473 | A * | 10/1993 | Kaspar | A47F 3/043 | 49/504 |
| 5,645,330 | A * | 7/1997 | Artwohl | F25D 27/00 | 49/504 |
| 6,029,411 | A * | 2/2000 | Richardson | E06B 3/66366 | 49/504 |
| 6,298,615 | B1 * | 10/2001 | Richardson | F25D 27/00 | 49/504 |
| 6,367,223 | B1 * | 4/2002 | Richardson | A47F 3/125 | 52/204.5 |
| 8,801,116 | B1 * | 8/2014 | Pack | B23P 6/00 | 312/405 |
| 8,998,354 | B2 | 4/2015 | Wach et al. | | |
| 9,389,013 | B2 | 7/2016 | Rolek et al. | | |
| 10,045,638 | B2 | 8/2018 | Artwohl | | |
| 10,390,632 | B2 | 8/2019 | Artwohl et al. | | |
| 10,898,011 | B2 | 1/2021 | Artwohl et al. | | |
| 10,918,225 | B2 * | 2/2021 | Olesen | A47F 3/043 | |
| 11,439,253 | B2 | 9/2022 | Artwohl et al. | | |
| 2002/0078654 | A1 * | 6/2002 | Richardson | A47F 3/125 | 49/504 |
| 2013/0285517 | A1 * | 10/2013 | Wach | A47F 3/043 | 49/504 |
| 2014/0203699 | A1 * | 7/2014 | Pack | B23P 6/00 | 312/405 |
| 2015/0338153 | A1 | 11/2015 | Zhao et al. | | |
| 2016/0047592 | A1 * | 2/2016 | Rolek | F25D 23/065 | 312/406.1 |
| 2018/0146798 | A1 | 5/2018 | Artwohl et al. | | |
| 2018/0344054 | A1 | 12/2018 | Artwohl et al. | | |
| 2019/0335922 | A1 | 11/2019 | Artwohl et al. | | |
| 2021/0227998 | A1 | 7/2021 | Artwohl et al. | | |

FOREIGN PATENT DOCUMENTS

| | | |
|---|---|---|
| CN | 106500435 | 3/2017 |
| EP | 1801525 | 1/2012 |
| EP | 2908074 | 8/2015 |
| EP | 2985551 | 2/2016 |
| GB | 335362 | 9/1930 |
| JP | 2002107078 | 4/2002 |
| WO | WO 2000/020719 | 4/2000 |
| WO | WO 2011/076445 | 6/2011 |
| WO | WO 2018/097912 | 5/2018 |

OTHER PUBLICATIONS

EP Office Action in European Application No. 17 800 979.1, dated Mar. 13, 2019, 5 pages.

International Search Report and Written Opinion in International Application No. PCT/US2017/057512, dated Jan. 16, 2018, 14 pages.

* cited by examiner

Region 902: 52.477 - 60.594 °F
Region 904: 44.361 - 52.477 °F
Region 906: 36.244 - 44.361 °F
Region 908: 28.128 - 36.244 °F
Region 910: 20.011 - 28.128 °F
Region 912: 11.895 - 20.011 °F
Region 914: 3.7783 - 11.895 °F
Region 916: -4.3382 - 3.7783 °F
Region 918: -12.455 - -4.3382 °F

THERMAL FRAME

CROSS-REFERENCE TO RELATED APPLICATIONS

This application is a continuation application of and claims priority to U.S. application Ser. No. 17/157,259, filed on Jan. 25, 2021, which is a continuation of and claims priority to U.S. application Ser. No. 16/518,633, filed on Jul. 22, 2019, now U.S. Pat. No. 10,898,011, which is a continuation of and claims priority to U.S. application Ser. No. 16/058,730, filed Aug. 8, 2018, now U.S. Pat. No. 10,390,632, which is a continuation application of and claims priority to U.S. application Ser. No. 15/362,589, filed on Nov. 28, 2016, now U.S. Pat. No. 10,045,638, the entire contents of each of which are incorporated by reference herein.

TECHNICAL FIELD

This invention relates to frames for temperature controlled environments.

BACKGROUND

Refrigerated enclosures are used in commercial, institutional, and residential applications for storing and/or displaying refrigerated or frozen objects. Refrigerated enclosures may be maintained at temperatures above freezing (e.g., a refrigerator) or at temperatures below freezing (e.g., a freezer). Refrigerated enclosures have one or more doors or windows for accessing refrigerated or frozen objects within a temperature-controlled space. Refrigerated enclosures include a frame that supports the doors or windows.

SUMMARY

One broad aspect of the invention features a refrigerator cabinet door frame. The door frame includes an outer frame member of a thermally conductive material, an inner frame member of a thermally insulating material, and a sealing plate. The outer frame member includes a forward end having an outer surface arranged to be disposed outside of a refrigerated cabinet with the frame mounted, and a rearward end defining a joint. The inner frame member includes a first end retained in the joint, and a second end spaced from the first end. The sealing plate includes a first edge coupled to the outer frame member at the rearward end of the outer frame member, forward of the joint, a second edge supported by the second end of the inner frame member, and a sealing surface of thermally conductive material exposed to receive a door seal. The first edge of the sealing plate is coupled to the outer frame member such that the sealing surface of the sealing plate and the outer surface of the forward end of the outer frame member together form a continuous heat transfer path of material more thermally conductive than the thermally insulating material of the inner frame member. This and other implementations can each optionally include one or more of the following features.

In some implementations, the joint can be a crimp joint. In some implementations, the joint can be a crimp groove, where the first end of the inner frame member is retained in the crimp groove of the outer frame member by a crimp of the outer frame member adjacent the groove. In some implementations, the joint can be an adhesive joint.

In some implementations, the thermal conductivity of the outer frame member is greater than 10 times thermal conductivity of the thermally insulating material of the inner frame member.

Some implementations include a heater wire in contact with the sealing plate.

Some implementations include a retaining clip coupling the sealing plate to the second end of the inner frame member.

In some implementations, the sealing plate includes a first, thermally conductive part and a second, thermally insulating part.

Another aspect of the invention features a refrigerated cabinet door frame assembly. The frame assembly includes a sealing plate, an inner frame member of a thermally insulating material, and an outer frame member of a thermally conductive material. The sealing plate includes a sealing surface of thermally conductive material exposed to receive a door seal. The inner frame member includes a first end and a second end spaced from the first end. The outer frame member includes a forward end having an outer surface arranged to be disposed outside of a refrigerated cabinet with the frame assembled, a rearward end defining a joint arranged to accept the first end of the inner frame member with the frame assembled, and a channel positioned at the reward end, forward of the joint to receive an edge of the sealing plate. With the frame assembled, the sealing plate is coupled to the outer frame member such that the sealing surface of the sealing plate and the outer surface of the forward end of the outer frame member together form a continuous heat transfer path of material more thermally conductive than the thermally insulating material of the inner frame member.

Another aspect of the invention features a refrigerated cabinet. The refrigerated cabinet includes a door frame mounted to an opening of the refrigerated cabinet. The door frame includes, in cross-section, an outer frame member of thermally conductive material, an inner frame member of thermally insulating material, and a sealing plate. The outer frame member includes a forward end having an outer surface arranged to be disposed outside of a refrigerated cabinet with the frame mounted, and a rearward end defining a joint. The inner frame member includes a first end retained in the joint of the outer frame member, and a second end spaced from the first end. The sealing plate includes a first edge coupled to the outer member at the rearward end of the outer member, forward of the crimp joint, a second edge supported by the second end of the inner frame member, and a sealing surface of thermally conductive material exposed to receive a door seal. The first edge of the sealing plate is coupled to the outer member such that the sealing surface of the sealing plate and the outer surface of the forward end of the outer frame member together form a continuous heat transfer path of material more thermally conductive than the thermally insulating material of the inner frame member.

The concepts described herein may provide several advantages. For example, implementations of the invention may provide a frame with improved thermal efficiency. Implementations may prevent or minimize condensation build up on door sealing surfaces. Implementations may provide for a more positive thermal seal between a thermal frame and a door.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 1:
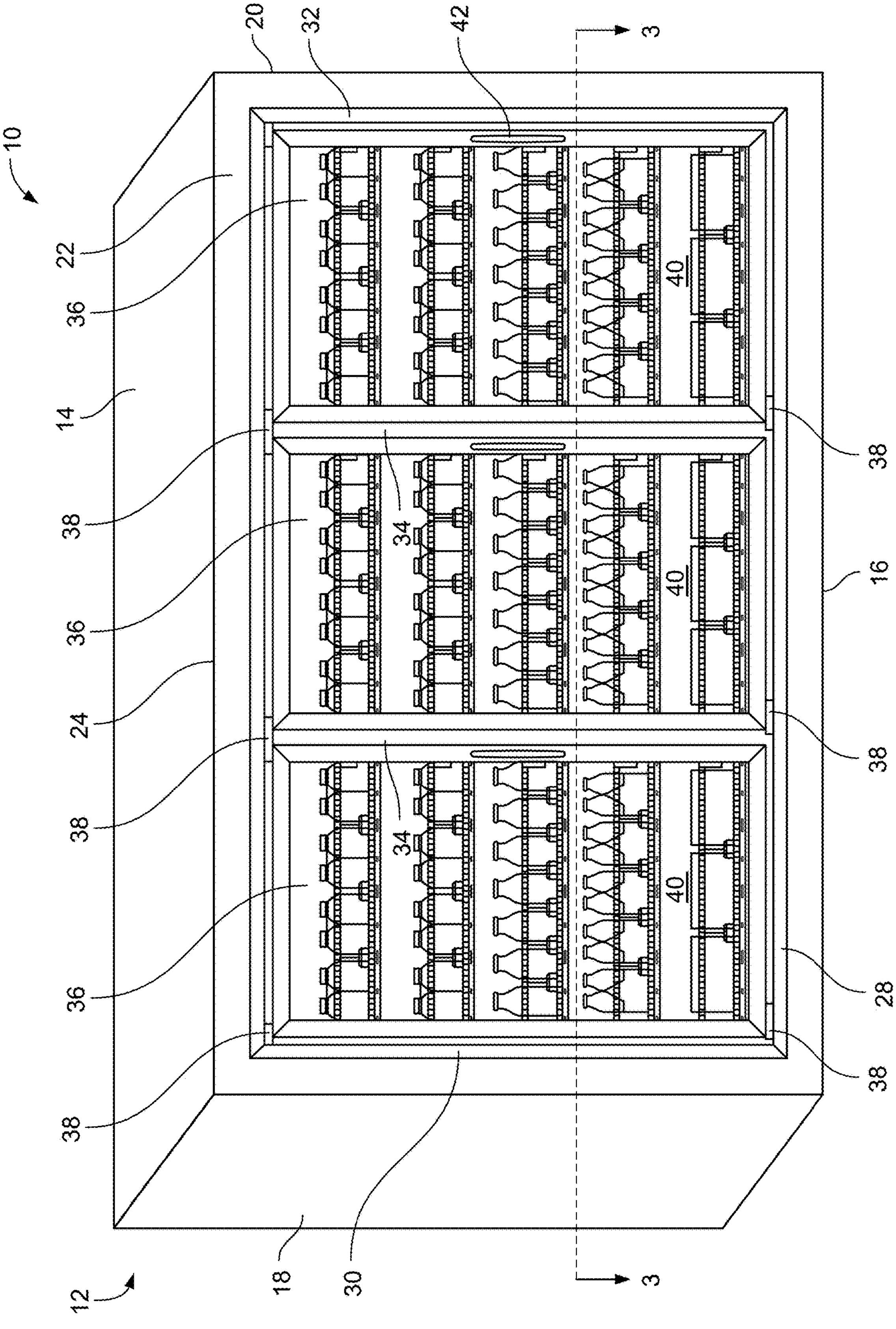
FIG. 1 is a perspective view of a refrigerated enclosure having multiple doors supported by a thermal frame.
Figure 2:
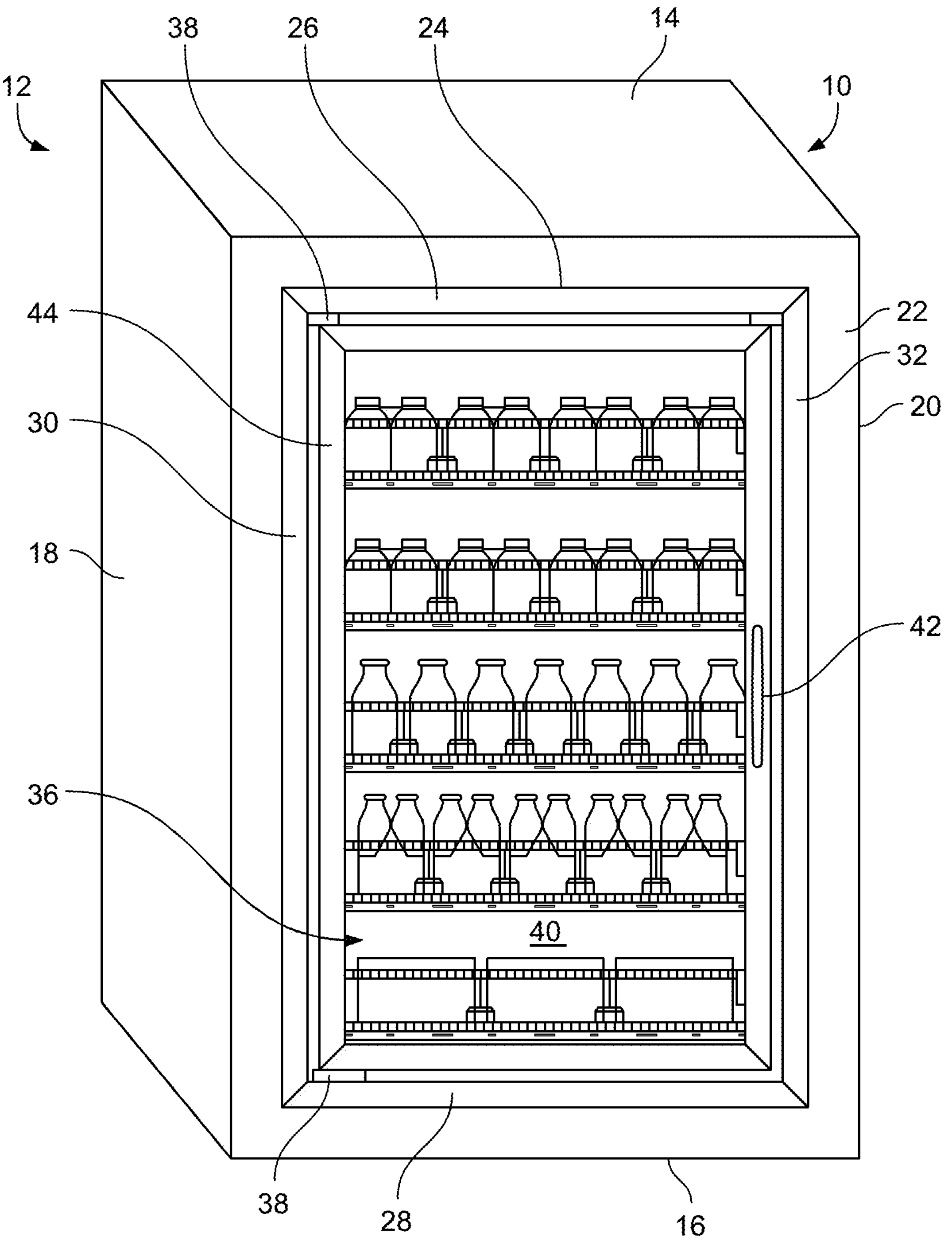
FIG. 2 is a perspective view of a refrigerated enclosure having a single door supported by a thermal frame.

FIGS. 1-2 show an exemplary refrigerated enclosure 10. Refrigerated enclosure 10 may be a refrigerator, freezer, or other enclosure defining a temperature-controlled space. In some implementations, refrigerated enclosure 10 is a refrigerated display case. For example, refrigerated enclosure 10 may be a refrigerated display case or refrigerated merchandiser in grocery stores, supermarkets, convenience stores, florist shops, and/or other commercial settings to store and display temperature-sensitive consumer goods (e.g., food products and the like). Refrigerated enclosure 10 can be used to display products that must be stored at relatively low temperatures and can include shelves, glass doors, and/or glass walls to permit viewing of the products supported by the shelves. In some implementations, refrigerated enclosure 10 is a refrigerated storage unit used, for example, in warehouses, restaurants, and lounges. Refrigerated enclosure 10 can be a free standing unit or "built in" unit that forms a part of the building in which refrigerated enclosure 10 is located.

Refrigerated enclosure 10 includes a body 12. Body 12 includes a top wall 14, a bottom wall 16, a left side wall 18, a right side wall 20, a rear wall (not shown), and a front portion 22 defining a temperature-controlled space. Front portion 22 includes an opening into the temperature-controlled space. Thermal frame 24 is can be mounted at least partially within the opening. Thermal frame 24 includes a plurality of perimeter frame segments (i.e., a header or top frame segment 26, a sill or bottom frame segment 28, a left side frame segment 30, and a right side frame segment 32) forming a closed shape along a perimeter of the opening. In some implementations, thermal frame 24 includes one or more mullion frame segments 34 dividing the opening into multiple smaller openings. For example, FIG. 1 illustrates a three-door assembly with a pair of mullion frame segments 34 extending between top frame segment 26 and bottom frame segment 28 to divide the opening into three smaller openings. Each of the smaller openings may correspond to a separate door 36 of the three-door assembly. In other implementations, mullion frame segments 34 may be omitted. For example, FIG. 2 illustrates a one-door assembly wherein thermal frame 24 includes perimeter frame segments 26-32 but not mullion frame segments 34. In some implementations, thermal frame 24 includes include top frame segment 26 and bottom frame segment 28 with no side frame segments 30 or 32. In such implementation, thermal frame 24 may include one or more mullion frame segments 34 depending, for example, on the size of the refrigerated enclosure in which thermal frame 204 is to be installed and the number of doors.

Refrigerated enclosure 10 includes one or more doors 36 pivotally mounted on the thermal frame 24 by hinges 38. In some implementations, the doors 36 are sliding doors configured to open and close by sliding relative to the thermal frame 24. The example doors 36 illustrated in FIGS. 1 and 2 include panel assemblies 40 and handles 42. Referring to FIG. 2, thermal frame 24 is includes a series of sealing plates 44. Sealing plates 44 are be attached to a front surface of thermal frame 24 and provide a sealing surface against which doors 36 rest in the closed position. For example, doors 36 may include a gasket or other sealing feature around a perimeter of each door 36. The gaskets may employ a flexible bellows and magnet arrangement, which, when the doors 36 are closed, engage sealing plates 44 to provide a seal between doors 36 and thermal frame 24. The thermal frames provide a thermally conductive path from the frame segments 26-32, for maintaining maintains the temperature of the sealing plates 44 at or close to the temperature of the external environment (e.g., the environment outside of the refrigerated enclosure 10) and to aid in preventing condensation from forming on the sealing plates 44. Preventing condensation on the sealing plates may provide for a more positive seal between the sealing plates 44 and a magnetic gasket on the door, thereby improving the thermal properties of the refrigerated enclosure 10.

Figure 3:
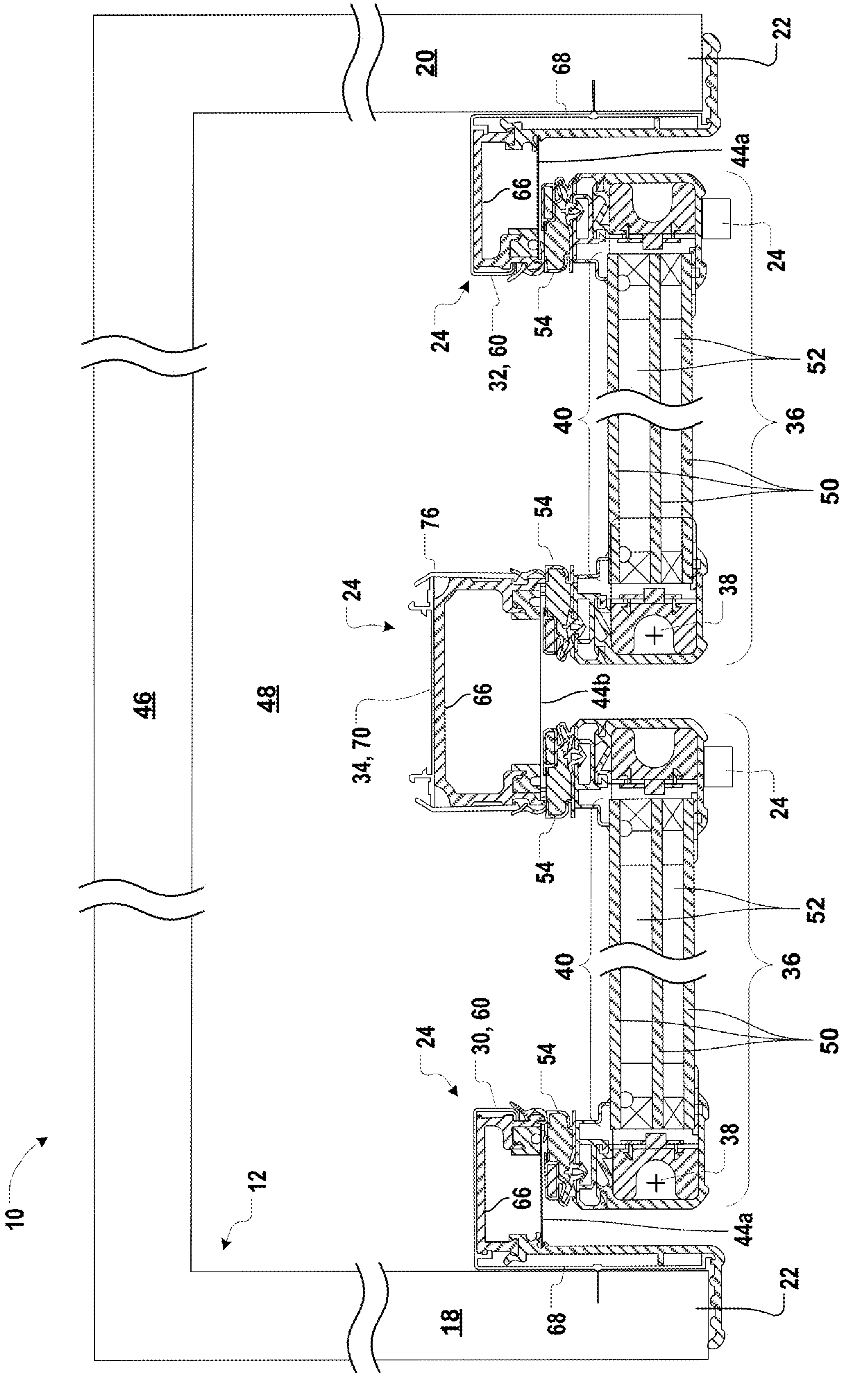
FIG. 3 is a cross-sectional view of an example thermal frame according to implementations of the present disclosure.

FIG. 3 illustrates a cross-sectional view of the refrigerated enclosure 10 taken along the line 3-3 in FIG. 1. FIG. 3 illustrates the pair of side walls 18 and 20 of the refrigerated enclosure 10 extending rearward from front portion 22, and a rear wall 46 extending between side walls 18 and 20 to define a temperature-controlled space 48 within the body 12.

In FIG. 3, refrigerated enclosure 10 is shown as a two-door assembly with a pair of doors 36 positioned in an opening in front portion 22. Refrigerated enclosure 10 may have two doors 36 (as shown in FIG. 3), a lesser number of doors 36 (e.g., a single door as shown in FIG. 2), or a greater number of doors 36 (e.g., three or more doors as shown in FIG. 1). Each door 36 includes a panel assembly 40 and a handle 42. Applying a force to handle 42 causes the corresponding door 36 to rotate about hinges 38 between an open position and a closed position. In some implementations, panel assembly 40 is a transparent or translucent panel assembly through which items within temperature-controlled space 48 can be viewed when doors 36 are in the closed position. For example, panel assembly 40 is shown to include a plurality of transparent or translucent panels 50 with spaces 52 therebetween. The spaces 52 can be sealed and filled with an insulating gas (e.g., argon) or evacuated to produce a vacuum between panels 50. In some embodiments, panel assembly 40 includes opaque panels with an insulating foam or other insulator therebetween, doors 36 include gaskets 54 attached to a rear surface of doors 36 along an outer perimeter of each door. Gaskets 54 are configured to engage a sealing surface of the sealing plates **44*a* and 44*b* (referred to collectively as sealing plates 44) when the doors 36 are in the closed position, and to thereby provide a seal between doors 36 and sealing plates 44**.

The perimeter frame segments 30-32 of the thermal frame 24 are coupled to the body 12 of the refrigerated enclosure 10 by mounting brackets 68. Mounting brackets 68 can be secured to perimeter frame segments 30-32 using one or more connection features (e.g., flanges, notches, grooves, collars, lips, etc.) or fasteners (e.g., bolts, screws, clips, etc.) and may hold perimeter frame segments 30-32 in a fixed position relative to the body 12 of the refrigerated enclosure 10.

Although only two perimeter frame segments 30-32 are shown in FIG. 3, other perimeter frame segments (e.g., header/top frame segment 26 and sill/bottom frame segment 28) may be configured in a similar manner. For example, top frame segment 26 and bottom frame segment 28 may be coupled to the body 12 of the refrigerated enclosure 10 by mounting brackets 68.

The perimeter frame segments 26-32 are hybrid frame segments that each include an outer frame member 64 and an inner frame member 66. Outer frame member 64 and inner frame member 66 are made of different materials. Outer frame member 64 is made of a material that has a higher thermal conductivity than the material from which inner frame member 66 is made. Thus, outer frame member 64 can conduct heat from the external environment (e.g., the environment outside of refrigerated enclosure 10) to sealing plate 44 without conducting the heat to inner frame member 66, and consequently, into refrigerated enclosure 10. Outer frame member 64 can be connected with sealing plate 44 to form a continuous heat transfer path from outer frame member 64 to sealing plate 44. This may help maintain the temperature of the sealing surface of sealing plates 44 (e.g., the outer surface of sealing plates 44) above the dew point of the external environment to prevent condensation from forming on the sealing surface. Prevention of condensation on the sealing surface may promote positive engagement and improved thermal seals between sealing plates 44 and door gaskets 54.

A perimeter frame segment assembly including a perimeter frame segment (i.e., one of frame segments 26-32), a mounting bracket 68, and a sealing plate 44 is described in greater detail with reference to FIGS. 4-8, below.

One or more mullion frame segments 34 extend vertically between top frame segment 26 and bottom frame segment 28. A top portion of mullion frame segment 34 is fastened to a top frame segment 26 and a bottom portion of mullion frame segment 34 is fastened to a bottom frame segment 28. Mounting bracket 76 may be secured to mullion frame segment 34 by one or more connection features (e.g., flanges, notches, grooves, collars, lips, etc.) or fasteners (e.g., bolts, screws, clips, etc.) that hold mounting bracket 76 in a fixed position relative to mullion frame segment 34. In some implementations, mounting bracket 76 includes a plurality of interconnected walls that define a front channel configured to receive mullion frame segment 34.

Referring now to FIGS. 4-8, a representative perimeter frame segment assembly 60 and components thereof are shown. Assembly 60 is shown to include a perimeter frame assembly 60 (i.e., one of frame segments 26-32), a mounting bracket 68, and a sealing plate 44. Perimeter frame assembly 60 includes an outer frame member 64 and an inner frame member 66. Outer frame member 64 extends at least partially outside of the opening of refrigerated enclosure 10. Inner frame member 66 is mounted to the assembly 60 inward of outer frame member 64. In some implementations, inner frame member 66 is mounted to the assembly 60 such that it resides completely inside the refrigerated enclosure 10.

Figure 4:
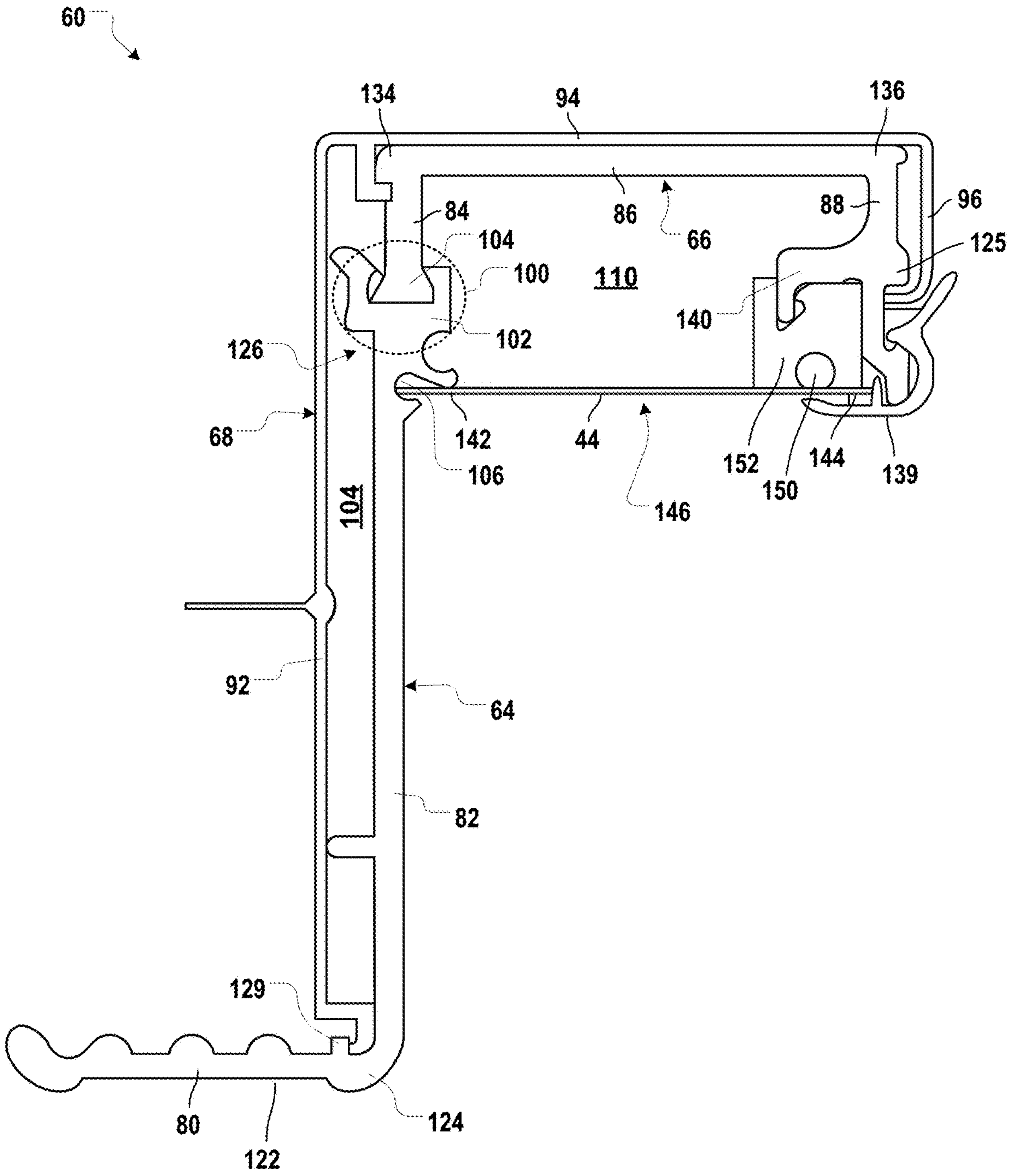
FIG. 4 is a cross-sectional view of an example perimeter frame assembly of FIG. 3 according to implementations of the present disclosure.

FIG. 4 is a cross-sectional view of assembly 60 and FIGS. 5-8 are perspective views illustrating the assembly 60 and components 62-68. Although only short segments of components 62-68 are shown in FIGS. 5-8, it is understood that components 62-68 may have any length. For example, assembly 60 may extend vertically between top frame segment 26 and bottom frame segment 28. Perimeter frame assembly 60 is a hybrid thermal frame 24. Outer frame member 64 is made from a thermally conductive material. Inner frame member 66 is made from a thermally insulating material. In other words, the thermal conductivity of outer frame member 64 is greater than the thermal conductivity of inner frame member 66.

Outer frame member 64 can be made from metallic material (e.g., aluminum, an aluminum alloy, carbon steel, or stainless steel, etc.). For example, aluminum or an aluminum alloy can be used for implementations in which a relatively light weight outer frame member 64 is desirable. A carbon steel or stainless steel outer frame member 64 can be used for implementations that require a stronger or stiffer (e.g., a higher modulus of elasticity) outer frame member 64. A stainless steel outer frame member 64 can be used to match the finish of existing decor or cabinetry in a commercial environment (e.g., a restaurant). For some applications, the thermal conductivity of outer frame member 64 may be greater than 100 BTU in/hr $ft^2$ ° F. In some implementations, the thermal conductivity of outer frame member 64 may be greater than 245 BTU in/hr $ft^2$ ° F. In some implementations, the thermal conductivity of outer frame member 64 may be greater than 380 BTU in/hr $ft^2$ ° F. In some implementations, the thermal conductivity of outer frame member 64 may be greater than 1500 BTU in/hr $ft^2$ ° F.

Inner frame member 66 can be made from materials including, but not limited to, a glass reinforced composite, a polyurethane glass reinforced composite, a polyester glass reinforced composite, or carbon fiber. In some implementations, inner frame member 66 can be made from a pultrusion of one of the above materials. For example, a polyurethane glass reinforced composite inner frame member 66 can be used for implementations that require a stronger or stiffer (e.g., a higher modulus of elasticity) inner frame member 66. A polyester glass reinforced composite inner frame member 66 can be used as a lower cost alternative in implementations that have lower strength and/or stiffness requirements for an inner frame member 66. Preferably, the thermal conductivity of inner frame member 66 is less than 10 BTU in/hr $ft^2$ ° F. In some implementations, the thermal conductivity of inner frame member 66 may be less than 1.5 BTU in/hr $ft^2$ ° F. In some implementations, the thermal conductivity of inner frame member 66 may be less than 1.1 BTU in/hr $ft^2$ ° F. In some implementations, the thermal conductivity of inner frame member 66 may be less than 0.8 BTU in/hr $ft^2$ ° F.

Outer frame member 64 includes two walls 80 and 82. Wall 82 has a forward end 124 and a rearward end 126. The walls 80 and 82 join at the forward end 124. Wall 80 has an outer surface 122. When installed in refrigerated enclosure 10, the outer surface 122 and outer end 124 are disposed outside of the opening in refrigerated enclosure 10. In other words, wall 80 extends along front portion 22 of refrigerated enclosure 10 (as shown in FIG. 3) and may be visible from the front of refrigerated enclosure 10 when doors 36 are closed (as shown in FIGS. 1-2). Wall 82 extends rearwardly from front portion 22 of refrigerated enclosure 10 (e.g., toward the rear wall 46) through the opening in body 12. In some implementations, walls 80 and 82 are oriented perpendicular to each other.

Inner frame member 66 includes 84, 86, and 88. Walls 84-88 generally form a C-shape or a U-shape surrounding a channel 110. The C-shape or U-shape of inner frame member 66 has a first end 104 at an edge of wall 84 and a second end 125 at the edge of wall 88. Wall 84 extends rearward from the outer frame member 64. Wall 86 extends in a second direction (e.g., other than rearwardly, to the right in FIG. 4) from a rearward end 134 of wall 84. In some implementations, wall 86 is oriented perpendicular to wall 84. Wall 86 extends toward the opposite frame segment of thermal frame 24. For example, if perimeter frame assembly 60 is the left side frame segment 30, wall 86 would extend toward right side frame segment 32. If perimeter frame assembly 60 is bottom frame segment 28, wall 84 would extend toward top frame segment 26. Wall 88 joins wall 86 at rearward end 136. Wall 88 extends forward from wall 86. In some implementations, walls 86 and 88 are oriented perpendicular to each other.

The rearward end 126 of outer member 64 and the first end 104 of inner member 66 are connected at a joint 100. Joint 100 can be any of various types of joints. For example, joint 100 can be a crimp groove, a snap joint, a groove and tennon, or an adhesive joint. In some implementations, an adhesive (e.g., a low-thermally conductive adhesive) can be applied to a crimp joint, snap joint, or groove and tennon joint. For example, as illustrated in FIG. 4, the rearward end 126 of wall 82 may include a crimp groove 102 and the first end 104 of inner member 66 may be shaped to engage the crimp groove. The first end 104 can be crimped within the crimp groove.

Sealing plate 44 is coupled to the outer member 64 and extends across channel 110 and to the second end 132 of outer member 66. The first end 142 of sealing plate 44 is thermally coupled to outer member 64 by a thermal coupling feature 106. Thermal coupling feature 106 is positioned outward from joint 100 along wall 82. Thermal coupling feature 106 can be a flange, groove, notch, lip, or collar, in which the sealing plate 44 is maintained in thermally conductive contact with outer frame member 64. In some implementations, thermally coupling feature 106 may include a thermally conductive adhesive. The first end 142 of sealing plate 44 is connected to thermal coupling feature 106 so as to form a continuous heat transfer path from the outer frame member 64 to the sealing plate 44. The sealing surface 146 of sealing plate includes a thermally conductive material that is exposed to receive and engage a door seal such as a gasket 54. Sealing plate 44 can be made from a thermally conductive material such as carbon steel. As noted above, the thermally conductive path may help maintain the temperature of the sealing surface 146 of sealing plate 44 above the dew point of the external environment to prevent condensation from forming on sealing surface 146. Prevention of condensation on the sealing surface may promote positive engagement and improved thermal seals between sealing plates 44 and door gaskets 54. In some implementations, sealing plate 44 is at least partially covered by a thin vinyl coating. For example, the outer surface of sealing plate 44 can be covered with the vinyl coating while the inside and side surfaces are left bare or plated with zinc to maintain thermally conductive contact with outer frame member 64.

The second end 144 of sealing plate is supported by the second end 125 of inner frame member 66. In some implementations, sealing plate 44 may be held in place with a retaining clip 139 (e.g., a zipper strip or other suitable fastening device). Retaining clip 132 may be coupled to wall 88 by an engagement feature 138 (e.g., a flange, a notch, a lip, a collar, a groove, etc.) of wall 88.

In some implementations, frame assembly 60 includes a heater wire 150 in contact with the second end 144 of sealing plate 44. In some implementations, the frame assembly 60 includes a support 152 configured to retain the heater wire 150 in position within the frame segment assembly 60. Support 152 may be connected to the inner frame member 66 by a flange 140 extending into the channel 110 from wall 88. Furthermore, support 152 may be made of a thermally insulating material such as cellular PVC.

Still referring to FIGS. 4-8, mounting bracket 68 is configured to secure perimeter frame assembly 60 to the perimeter of the opening in body 12 of refrigerated enclosure 10. Mounting bracket 68 may be attached to perimeter frame assembly 60 via one or more engagement features (e.g., flange, collar, flange, grooves, notches, etc.) and/or fasteners and may be fixed to an inner perimeter of the opening in body 12. Mounting bracket 68 can be made from a glass reinforced composite material.

Mounting bracket 68 is shown to include a plurality of walls 92, 94, and 96 that define the general shape of mounting bracket 68. Wall 92 may be disposed between wall 82 of outer frame member 64 and the perimeter of the opening in the body 12 of the refrigerated enclosure 10. Wall 92 extends rearwardly from front portion 22 of the enclosure 10 through the opening in the body 12.

Wall 94 is disposed rearward of the inner frame member 66. Wall 94 extends in the second direction (e.g., to the right in FIG. 4) from a rearward end of wall 92. Wall 94 extends toward the opposite frame segment of thermal frame 24. In some implementations, wall 94 is oriented substantially perpendicular to wall 92.

Wall 96 extends forward from wall 94 toward front portion 22 of refrigerated enclosure 10. Wall 96 extends forward from an end of wall 84 to define a front channel between walls 92, 94, and 96. In some implementations, wall 96 is oriented substantially perpendicular to wall 94. In some implementations, front channel is a “C-shaped” or “U-shaped” channel with an open front. Perimeter frame assembly 60 is be located at least partially within front channel.

Mounting bracket 68 may be made from a rigid or substantially rigid insulator such as PVC or another polymer and may be configured to provide thermal insulation between perimeter frame assembly 60 and body 12.

In some embodiments, perimeter frame segment assembly 60 includes a lighting element (e.g., an LED strip, a fluorescent tube, an incandescent bulb, etc.) attached to one or more of components 62-68 and configured to illuminate the interior of refrigerated enclosure 10. The lighting element may be disposed along a rear surface of mounting bracket 68 and configured to emit light toward items within temperature-controlled space 48. In some implementations, assembly 60 includes a mounting plate. The mounting plate may include one or more studs that extend through mounting bracket 68 and attach to the lighting element rearward of bracket 68. In other embodiments, the lighting element may be secured to assembly 60 by a channel system along the rear surface of the mounting bracket 68, by one or more fasteners (e.g., snap fittings, structural adhesive tape, bolts, screws, etc.), or any other means for attaching the lighting element to assembly 60. In some implementations, assembly 60 includes a wireway (e.g., a channel, a path, a guide, etc.) configured to route a power wire and/or signal wire from the lighting element to assembly 60. The wireway may be attached to a top of bottom of assembly 60 to cover a wiring connection between the lighting element and assembly 60.

Figure 5:
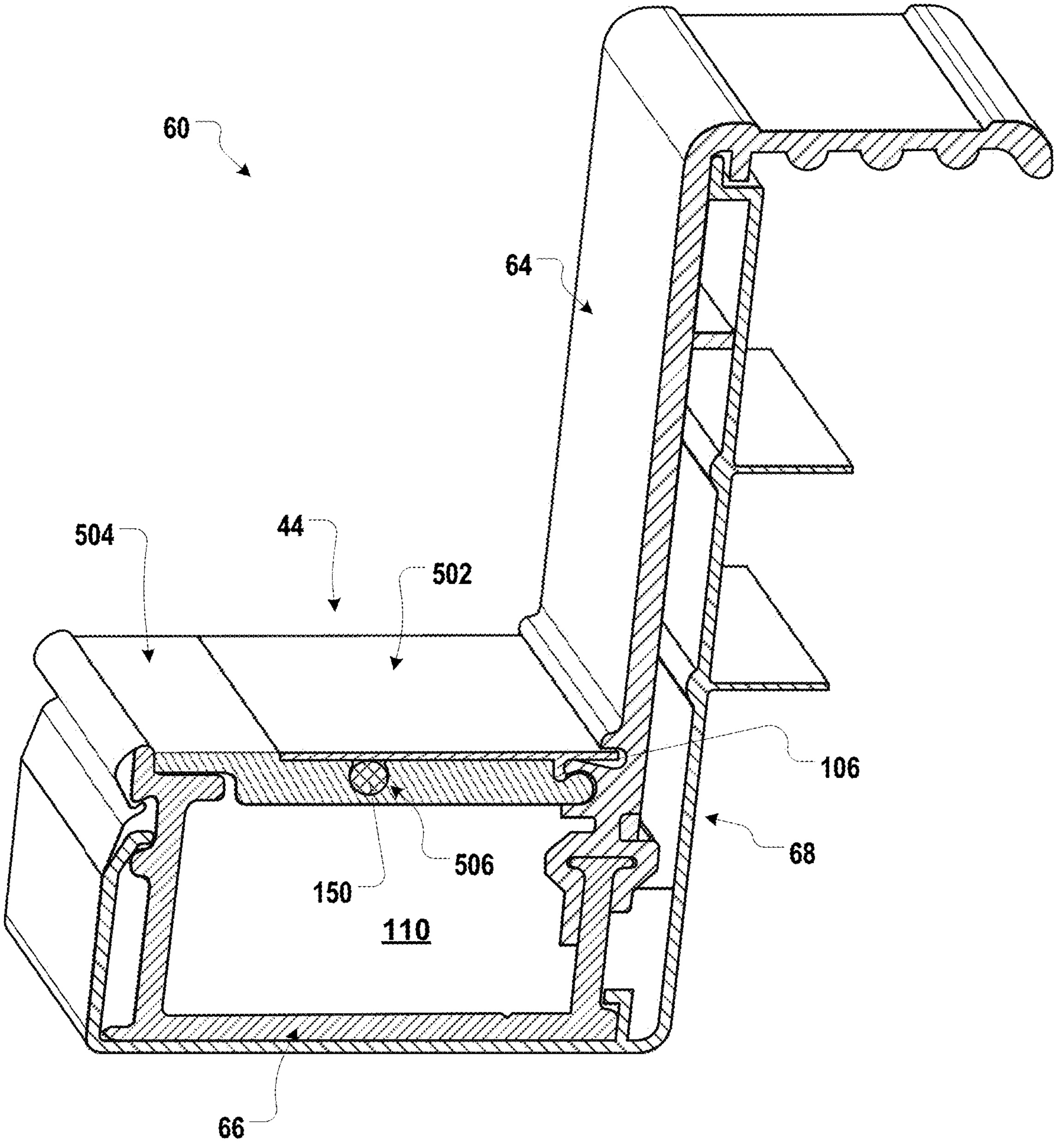
FIG. 5 is a perspective view of the example perimeter frame assembly of FIG. 4.
Figure 6:
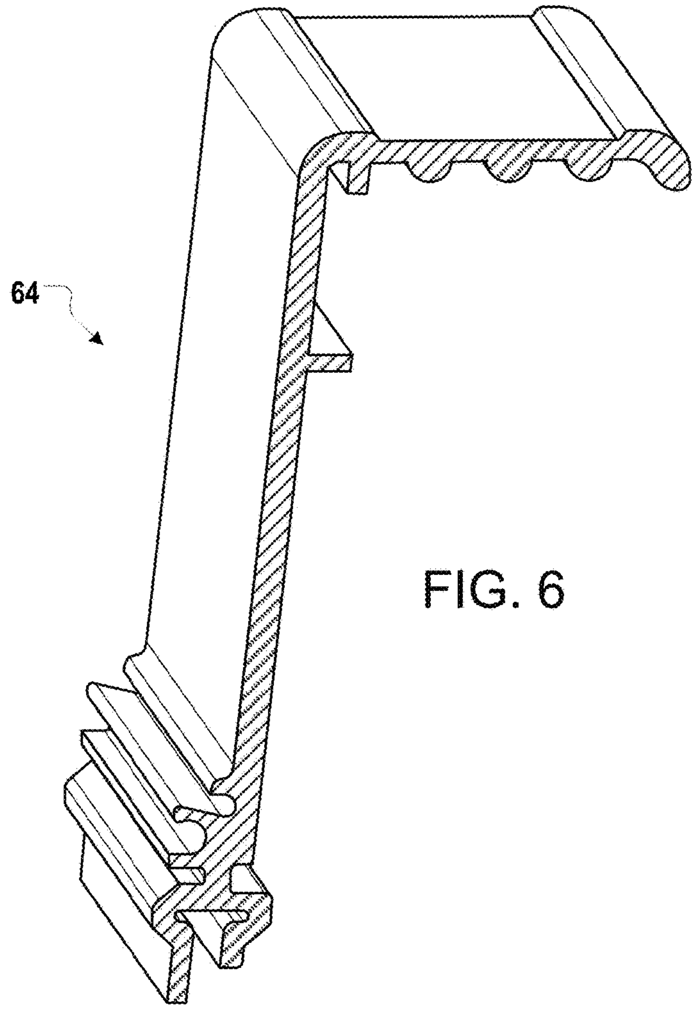
FIG. 6 is a perspective view of the outer member of the perimeter frame segment of FIG. 4.
Figure 7:
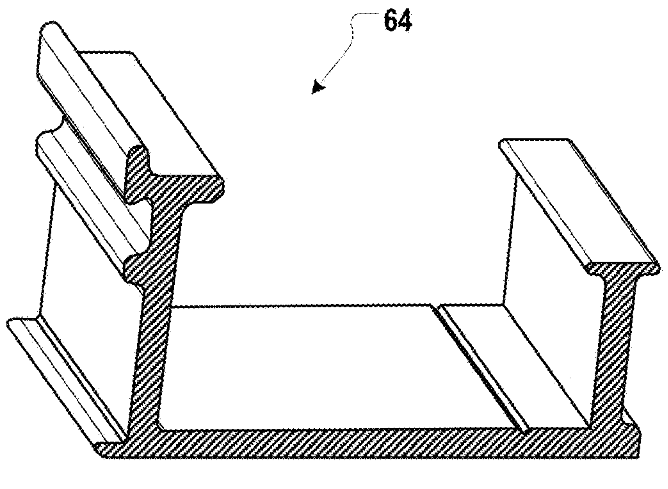
FIG. 7 is a perspective view of the inner member of the perimeter frame segment of FIG. 4.
Figure 8:
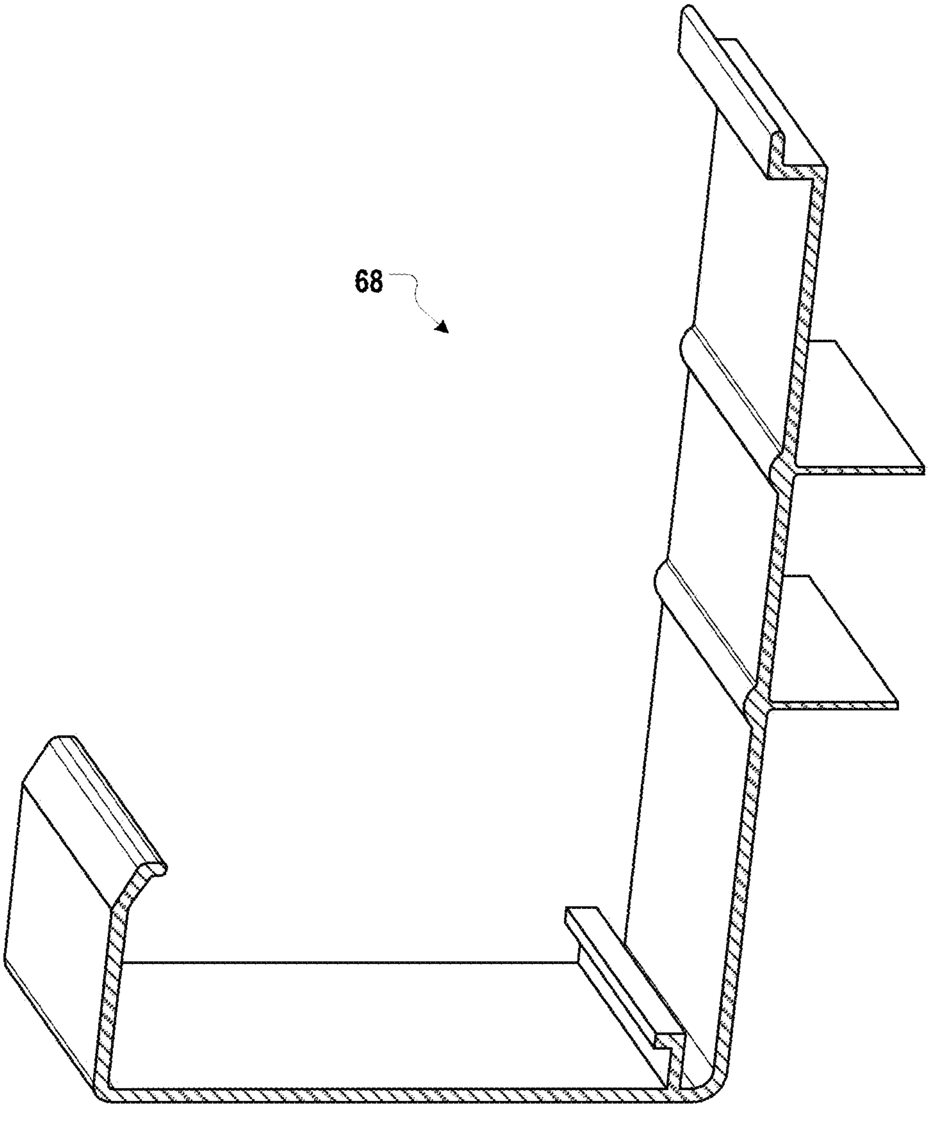
FIG. 8 is a perspective view of the mounting bracket of FIG. 4.

FIG. 5 illustrates an alternate, two-part configuration of sealing plate 44 for thermal frame assembly 60. The first part 502 of sealing plate 44 is thermally coupled to outer member 64 at thermal coupling feature 106. The first part 502 extents partially across the channel 110 and is supported by a second part 504. The first part 502 of the sealing plate 44 is made of a thermally conductive material such as carbon steel. The second part 504 of sealing plate 44 couples to outer member 64 and extends across the channel and rests on inner member 66. The second part 504 of the sealing plate 44 is made of a thermally insulating material such as cellular PVC. Heater wire 150 extends along a wireway 506 located in recess in second part 502 of sealing plate 44.

Figure 9:
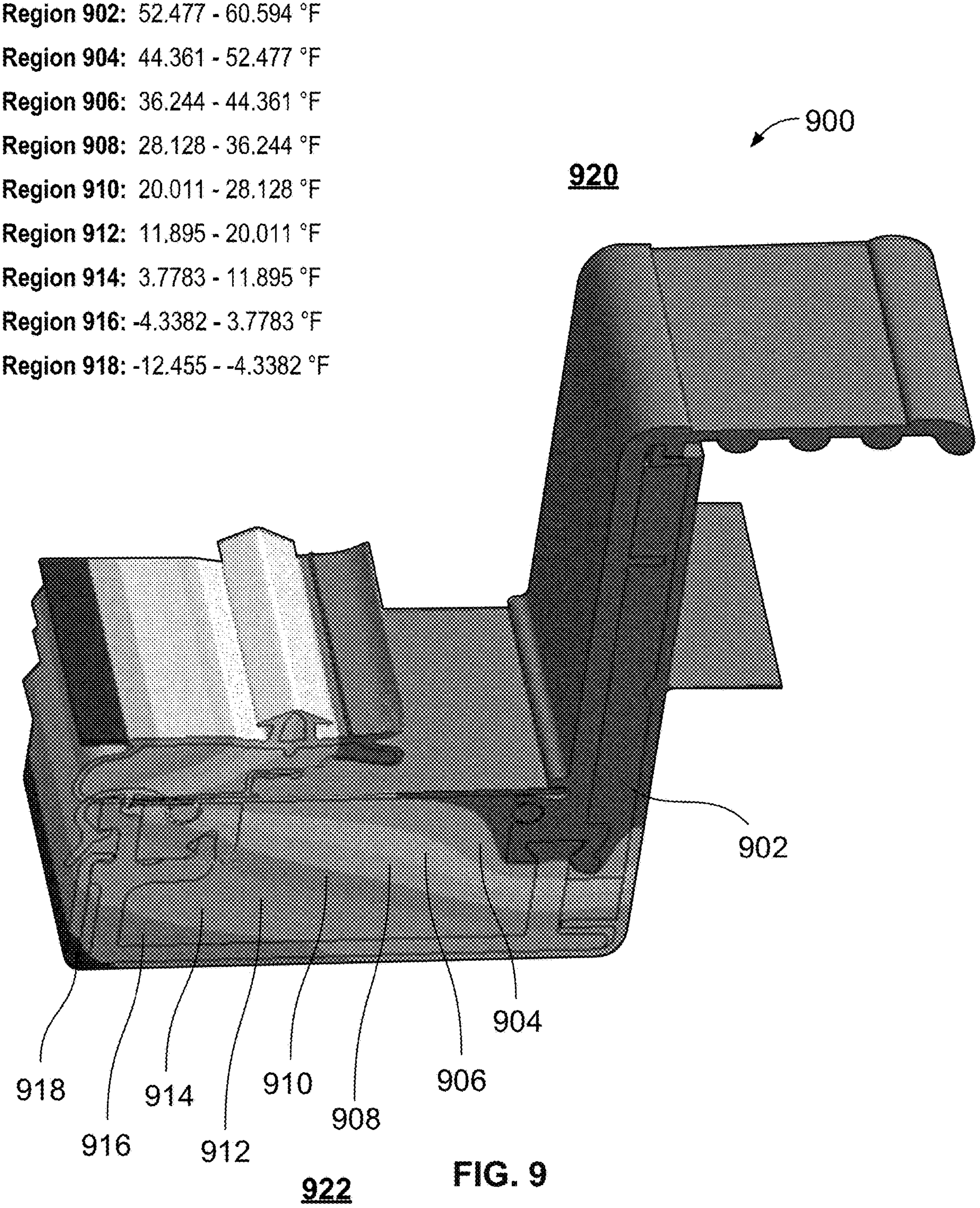
FIG. 9 shows a thermal map of results from a thermal model of the perimeter frame assembly of FIG. 4.

FIG. 9 shows a thermal map 900 of results from thermal modeling performed on the perimeter frame assembly of FIG. 4. Each of the element numbers 902-918 represent different temperature regions within the thermal frame assembly. The external environment 920 was held at 75° F. and the internal temperature 922 (e.g., simulating the inside of a freezer) was held at −15° F., As illustrated by the temperature region 902 extending along the outer member and to the sealing plate, the thermally conductive outer member of the frame assembly readily conducts heat from the external environment to the thermal plate. Thus the outer member and sealing plate are maintained at a relatively uniform temperature with the external environment. Yet, the heat from the external environment abruptly stops that the junction between the thermally conductive outer member and the thermally insulative inner member. There is a relatively steep temperature gradient, as indicated by the rapid transition of temperature regions 902-912 in a short distance past the joint. This steep temperature gradient indicates that the thermally insulative inner member is preventing a significant amount of heat from the external environment from entering into the inside of the refrigerated enclosure.

As used herein, the terms "perpendicular," "substantially perpendicular," or "approximately perpendicular" refer to an orientation of two elements (e.g., lines, axes, planes, surfaces, walls, or components) with respect to one and other that forms a ninety degree (perpendicular) angle within acceptable engineering, machining, or measurement tolerances. For example, two surfaces can be considered orthogonal to each other if the angle between the surfaces is within an acceptable tolerance of ninety degrees (e.g., ±1-5 degrees).

It should be noted that the orientation of various elements may differ according to other exemplary embodiments, and that such variations are intended to be encompassed by the present disclosure.

While a number of examples have been described for illustration purposes, the foregoing description is not intended to limit the scope of the invention, which is defined by the scope of the appended claims. There are and will be other examples and modifications within the scope of the following claims. For example, the construction and arrangement of the refrigerated case with thermal door frame as shown in the various exemplary embodiments is illustrative only. Although only a few embodiments of the present inventions have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the description and advantages of the subject matter disclosed herein. For example, elements shown as integrally formed may be constructed of multiple parts or elements, the position of elements may be reversed or otherwise varied, and the nature or number of discrete elements or positions may be altered or varied. Accordingly, all such modifications are intended to be included within the scope of the present invention as defined in the appended claims. Other substitutions, modifications, changes and omissions may be made in the design, operating conditions and arrangement of the various exemplary embodiments without departing from the scope of the present inventions.

What is claimed is:

1. A hybrid door frame for a refrigerator cabinet, the hybrid door frame comprising a metallic outer frame member coupled to a polymer inner frame member with a door sealing plate extending between the metallic outer frame member and the polymer inner frame member, wherein a portion of the metallic outer frame member extends inward past a plane of the door sealing plate while the polymer inner frame member is arranged relative to the metallic outer frame member so as to be positioned entirely inward of a cabinet door with the hybrid frame mounted to the refrigerator cabinet, and wherein the polymer inner frame member is coupled to the metallic outer frame member by a joint comprising a groove at a free end of the metallic outer frame member that extends along a majority of a length of the metallic outer frame member, and within which a portion of the polymer inner frame member fits.

2. The hybrid door frame of claim 1, wherein a first edge of the door sealing plate is coupled to the metallic outer frame member, and a second edge of the door sealing plate is supported by the polymer inner frame member.

3. The hybrid door frame of claim 2, wherein the door sealing plate is in contact with a heating wire housed in the polymer inner frame member.

4. The hybrid door frame of claim 3, wherein the first edge of the sealing door plate is coupled to the metallic outer frame member forming a continuous heat transfer path between the door sealing plate and the metallic outer frame member.

5. The hybrid door frame of claim 4, wherein the metallic outer frame member comprises an L-shape, and wherein the polymer inner frame member comprises a channel extending through a central region of the polymer inner frame member.

6. The hybrid door frame of claim 5, wherein a thermal conductivity of the metallic outer frame member is between 100 BTU in/hr ft$^2$ ° F. and 1500 BTU in/hr ft$^2$ ° F., and wherein a thermal conductivity of the polymer inner frame member is between 0.8 BTU in/hr ft$^2$ ° F. and 10 BTU in/hr ft$^2$ ° F.

7. The hybrid door frame of claim 5, wherein the joint places the metallic outer frame member and the polymer inner frame member in direct contact with one another.

8. A refrigerated display case comprising a hybrid door frame mounted to an opening of the refrigerated display case, the hybrid door frame comprising a metallic outer frame member coupled to, and in direct contact with, a polymer inner frame member with a door sealing plate extending between the metallic outer frame member and the polymer inner frame member, wherein a portion of the metallic outer frame member extends inward past a plane of the door sealing plate while the polymer inner frame member is positioned entirely inward of a door mounted to the refrigerated display case, and wherein the polymer inner frame member is coupled to the metallic outer frame member by a joint comprising a groove at a free end of the metallic outer frame member within which a portion of the polymer inner frame member fits.

9. The refrigerated display case of claim 8, wherein a first edge of the door sealing plate is coupled to the metallic outer frame member, and a second edge of the door sealing plate is supported by the polymer inner frame member.

10. The refrigerated display case of claim 9, wherein the door sealing plate is in contact with a heating wire housed in the polymer inner frame member and spaced apart from the metallic outer frame member.

11. The refrigerated display case of claim 10, wherein the first edge of the door sealing plate is coupled to the metallic outer frame member forming a continuous heat transfer path between the door sealing plate and the metallic outer frame member.

12. The refrigerated display case of claim 11, wherein the metallic outer frame member comprises an L-shape, and wherein the polymer inner frame member comprises a channel extending through a central region of the polymer inner frame member.

13. The refrigerated display case of claim 12, wherein a thermal conductivity of the metallic outer frame member is between 100 BTU in/hr ft$^2$ ° F. and 1500 BTU in/hr ft$^2$ ° F., and wherein a thermal conductivity of the polymer inner frame member is between 0.8 BTU in/hr ft$^2$ ° F. and 10 BTU in/hr ft$^2$ ° F.

14. A hybrid door frame for a refrigerated display case, the hybrid door frame comprising a metallic outer frame member coupled to, and in direct contact with, a polymer inner frame member by a joint comprising a groove at a free end of the metallic outer frame member within which a portion of the polymer inner frame member is fit, wherein the hybrid door frame further comprises a door sealing plate, wherein a first edge of the door sealing plate is coupled to the metallic outer frame member, and a second edge of the door sealing plate is supported by the polymer inner frame member.

15. The refrigerated display case of claim 14, wherein the joint at which the metallic outer frame member couples to the polymer inner frame member is positioned inward of the door sealing plate.

16. The refrigerated display case of claim 14, wherein the polymer inner frame member houses a heating wire that is spaced apart from the metallic outer frame member, and wherein the door sealing plate is in contact with the heating wire.

17. The refrigerated display case of claim 16, wherein the first edge of the door sealing plate is coupled to the metallic outer frame member forming a continuous heat transfer path between the door sealing plate and the metallic outer frame member.

18. The refrigerated display case of claim 17, wherein the metallic outer frame member comprises an L-shape, and wherein the polymer inner frame member comprises a channel extending through a central region of the polymer inner frame member.

19. The refrigerated display case of claim 18, wherein a thermal conductivity of the metallic outer frame member is between 100 BTU in/hr ft$^2$ ° F. and 1500 BTU in/hr ft$^2$ ° F., and wherein a thermal conductivity of the polymer inner frame member is between 0.8 BTU in/hr ft$^2$ ° F. and 10 BTU in/hr ft$^2$ ° F.

* * * * *